2,993,054
ALPHA-FIVE CARBON CYCLIC HYDROCARBON MANDELIC ACID ESTERS OF BETA-PYRROLIDINO-ETHANOL

Robert B. Moffett and John L. White, Kalamazoo, Mich., assignors to The Upjohn Company, Kalamazoo, Mich., a corporation of Michigan
No Drawing. Filed Mar. 22, 1954, Ser. No. 417,916
6 Claims. (Cl. 260—326.3)

This invention relates to novel aminoesters, more particularly to pyrrolidylalkyl esters of disubstituted hydroxyacetic acids. These compounds are physiologically active, especially as antispasmodic and antisecretory agents.

It is an object of the present invention to provide novel pyrrolidylalkyl esters of disubstituted hydroxyacetic acids. Other objects will be apparent to those skilled in the art to which this invention pertains.

The novel pyrrolidylalkyl esters of disubstituted hydroxyacetic acids of the present invention are represented by the following structural formula:

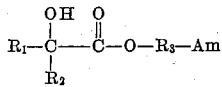

wherein $R_1$ is a hydrocarbon radical containing from one to twelve carbon atoms, inclusive; $R_2$ contains less than twelve carbon atoms and is lower-alkyl or a five or six membered cycloalkyl group; $R_1$ and $R_2$ together contain a total of more than six carbon atoms; $R_3$ is a lower-alkylene divalent radical having two carbon atoms between its valences; and Am is N-pyrrolidyl or a methyl substituted N-pyrrolidyl radical, acid addition salts thereof, and quaternary ammonium salts thereof.

Examples of hydrocarbon radicals represented by $R_2$ above are methyl, ethyl, propyl, isopropyl, amyl, isoamyl, hexyl, heptyl, octyl, cyclopentyl, 1-methylcyclopentyl, cyclohexyl, 2,4,6-trimethylcyclohexyl, and hendecyl.

Examples of hydrocarbon radicals represented by $R_1$ above include the $R_2$ groups named above and n-decyl, n-dodecyl, phenyl, benzyl, 2,4,6-trimethylphenyl, α-methylbenzyl, tolyl, p-biphenylyl, p-cyclohexylphenyl, 2-phenylcyclopentyl, o-cyclohexylphenyl, and naphthyl.

The divalent radical $R_3$ may be further described by the formula

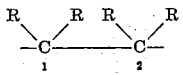

In this formula the R's are hydrogen and/or lower-alkyl groups. Examples of $R_3$ are the radicals ethylene (—CH$_2$CH$_2$—), propylene, 1-ethylethylene, 2-ethylethylene, 1,2-dimethylethylene, 1,1-dimethylethylene, 2,2-dimethylethylene, 1,2,2-trimethylethylene, 1-(n)-hexylethylene, 2-(n)-propylethylene, etc.

Examples of Am include pyrrolidyl, 2-methylpyrrolidyl, 3-methylpyrrolidyl, 2,5-dimethylpyrrolidyl, 2,3-dimethylpyrrolidyl, 2,2-dimethylpyrrolidyl, 2,2,3-trimethylpyrrolidyl, etc.

The acid addition salts of the above-described compounds include the hydrochloride, sulfate, acid sulfate, succinate, nitrate, acetate, tartrate, citrate, phosphate, etc. The quaternary ammonium salts include the methobromide, methochloride, methiodide, ethiodide, ethochloride, benzyl chloride, dodecyl chloride, bis-hexamethylene dichloride, etc.

The novel compounds of the present invention can be prepared by reaction of the selected disubstituted hydroxyacetic acid with the selected pyrrolidylalkyl chloride or bromide. This is conveniently achieved by heating a solution of the acid in acetone or other inert solvent with an acid addition salt of the pyrrolidylalkyl halide, in the presence of potassium or sodium carbonate or other base capable of reaction with the acid addition salt of the pyrrolidylalkyl halide to produce the free pyrrolidylalkyl halide. The pyrrolidylalkyl chloride hydrochlorides or bromide hydrobromides are prepared by the reaction of thionyl chloride or bromide, respectively, for example, in the manner described in the preparations hereinafter, with the selected pyrrolidyl alkanol. Examples of the pyrrolidyl alkanols which may be used may be found in the article by Moffett, J. Org. Chem., 14, 862 (1949) and by Moffett and White, ibid., 17, 407 (1952). The disubstituted hydroxyacetic acids may be prepared in a number of ways, for example, by the reaction of a hydrocarbon magnesium halide with benzoylformic acid or other hydrocarbon-α-ketoacid; by the hydrolysis of the cyanohydrin of a ketone with concentrated sulfuric acid; by the benzilic acid type of rearrangement of an α-diketone; or by the hydrogenation of an unsaturated α-hydroxy acid. For examples of these reactions see: McKenzie and Ritchie, Ber., 70B, 33 (1937); Hoffmann and Schellenberg, Helv. Chim. Acta, 30, 292 (1947); Biel, Friedman, Leiser and Sprengeler, J. Am. Chem. Soc., 74, 1485 (1952); Stoughton, J. Am. Chem. Soc., 63, 2376 (1941); Wallach, Ann., 414, 296 (1918); ibid., 437, 166 (1924); Nicolet and Jurish, J. Am. Chem. Soc., 44, 1136 (1922); Fuson, J. Am. Chem. Soc., 61, 1937 (1939). Examples of the α,α-disubstituted-α-hydroxyacetic acids which can be thus-prepared include α-ethylmandelic acid, α-n-propylmandelic acid, α-butylmandelic acid, α-n-heptylmandelic acid, α-(5-methylhexyl)mandelic acid, α-cyclopentyl-α-cyclohexyl-α-hydroxyacetic acid, α,α-dicyclohexyl-α-hydroxyacetic acid, α-cyclopentyl-α-n-propyl-α-hydroxyacetic acid, α-n-propyl-α-isoamyl-α-hydroxyacetic acid and other acids of the formula

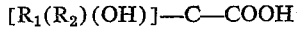

wherein $R_1$ and $R_2$ have the values given hereinbefore.

Compounds produced by the esterification of a pyrrolidylalkyl chloride or bromide with an α,α-disubstituted-α-hydroxyacetic acid include 2,2-dimethylpyrrolidylethyl n-propylmandelate,
2-methylpyrrolidylethyl n-octylmandelate,
pyrrolidyl-2-propyl cyclohexylmandelate,
2,5-dimethylpyrrolidylethyl α-cyclopentyl-α-cyclohexyl-α-hydroxyacetate,
2,5 - dimethylpyrrolidylethyl α - cyclopentyl-α-n-propyl-α-hydroxyacetate,
2,2-dimethylpyrrolidyl-2-propyl α-cyclohexyl-α-n-octyl-α-hydroxyacetate,
2-methylpyrrolidylethyl α-n-propyl-α-isobutyl-α-hydroxyacetate,
2,5 - dimethylpyrrolidylethyl α-n-octyl-α-(1-naphthyl)-α-hydroxyacetate, and
2-methylpyrrolidylethyl α-biphenylyl - α - n - propyl-α-hydroxyacetate.

Ordinarily, the boiling point of the reaction mixture, e.g., from about 35 to 100 degrees centigrade, is a satisfactory reaction temperature. The reaction mixture is usually refluxed for several hours to ensure complete reaction. It is usually preferred to employ the acid and the pyrrolidylalkyl halide in equimolar proportions in the reaction.

Although acetone is a convenient solvent, a higher boiling solvent is sometimes preferred, e.g., methyl ethyl ketone, ethanol, propanol or diethyl ketone. The base used to react with the acid addition salt of the pyrrolidylalkyl halide is usually employed in excess of the amount theoretically required.

The reaction product can be isolated by distilling the reaction solvent and dissolving the organic residue in ether. Washing the ether solution with dilute alkali removes any acidic material and any quaternary ammonium salts. The ether solution can then be dried and the product isolated by distillation to leave the free base as the distillation residue or by preparation of the acid addition salt or quaternary ammonium salt according to methods known in the art. Ordinarily, the free bases are not stable to distillation and must be purified by other techniques, e.g., as their acid addition salts.

The following examples are illustrative of the products and process of the present invention, but are not to be construed as limiting.

PREPARATION 1

*Isoamylmandelic acid ($\alpha$-phenyl-$\alpha$-isoamyl-$\alpha$-hydroxyacetic acid)*

To a solution of 97.6 grams (0.65 mole) of benzoylformic acid in 500 milliliters of dry tetrahydrofuran was added the solution of isoamyl magnesium bromide prepared by the reaction of 211.4 grams (1.4 moles) of isoamyl bromide with about fifty grams (two moles) of magnesium filings in 500 milliliters of tetrahydrofuran. The resulting mixture was stirred at room temperature for sixteen hours. The thus-produced Grignard complex was carefully decomposed with ice water. Most of the tetrahydrofuran was distilled from the mixture and the aqueous distillation residue was carefully acidified to precipitate an oil. The oil was separated, dried and then crystallized from Skellysolve B hexane hydrocarbons to give 28.0 grams of isoamylmandelic acid melting at 125.5 to 126.6 degrees centigrade.

Calculated for $C_{13}H_{18}O_3$: C, 70.22; H, 8.16. Found: C, 70.29; H, 8.21.

PREPARATION 2

*$\beta$-(2,2-dimethylpyrrolidyl)ethylchloride hydrochloride*

$\beta$-(2,2,-dimethylpyrrolidyl)ethylchloride hydrochloride was prepared in quantitative yield from $\beta$-(2,2-dimethylpyrrolidyl)ethanol [Moffett and White, J. Odg. Chem., 17, 407 (1952)] by dissolving 85.9 grams (0.60 mole) of $\beta$-(2,2-dimethylpyrrolidyl)ethanol in 250 milliliters of dry benzene, saturating the resulting solution with dry hydrogen chloride, and then slowly adding 118.9 grams (1.0 mole) of thionyl chloride to the refluxing benzene solution over a period of one hour. A sample recrystallized from isopropyl alcohol melted at 201 to 202 degrees centigrade.

Calculated for $C_8H_{17}Cl_2N$: Cl, 35.79; N, 7.09. Found: Cl, 35.84; N, 6.98.

EXAMPLE 1

*$\beta$-pyrrolidylethyl isoamylmandelate and its hydrochloride*

A mixture of 9.5 grams (0.043 mole) of isoamylmandelic acid ($\alpha$-isoamyl-$\alpha$-phenyl-$\alpha$-hydroxyacetic acid), 7.3 grams (0.43 mole) of $\beta$-pyrrolidylethyl chloride hydrochloride, 18.2 grams (0.18 mole) of anhydrous potassium carbonate and about fifty milliliters of methylethylketone was stirred at the refluxing temperature of the methylethylketone for nineteen hours. The reaction mixture was then cooled, filtered and the filter cake washed with ether. The filtrate and washes were combined and extracted with dilute aqueous hydrochloric acid. The acid solution was made basic with diluate aqueous sodium hydroxide and the thus-produced oily precipitate of $\beta$-pyrrolidylethyl isoamylmandelate extracted with ether. The ether solution was dried with anhydrous potassium carbonate, the potassium carbonate removed and the ether solution made acidic with dry hydrogen chloride. The 12.1 grams, a yield of eighty percent of the theoretical, of white precipitate of $\beta$-pyrrolidylethyl isoamylmandelate hydrochloride was recrystallized from a mixture of methylethylketone and methanol. The recrystallized product melted at 161 to 161.5 degrees centigrade.

Calculated for $C_{19}H_{30}O_3NCl$: Cl, 9.97. Found: 9.54.

Similarly, other acid addition salts of $\beta$-pyrrolidylethyl isoamylmandelate may be prepared by reaction of the latter compound with a preferably anhydrous acid. The quaternary salts may be prepared by reaction of $\beta$-pyrrolidylethyl isoamylmandelate with usually a large molar equivalent excess of the selected alkyl halide, preferably lower-alkyl chloride, bromide, or iodide.

EXAMPLE 2

*$\beta$-(2-methylpyrrolidyl)ethyl isoamylmandelate hydrochloride*

Following the procedure described in Example 1, isoamylmandelic acid, $\beta$-(2-methylpyrrolidyl)ethylchloride hydrochloride and potassium carbonate in acetone were reacted together to produce $\beta$-(2-methylpyrrolidyl)ethyl isoamymandelate hydrochloride in 74 percent yield. The hydrochloride melted at 140 to 141 degrees centigrade after crystallization from a mixture of ethyl acetate and ether.

Calculated for $C_{10}H_{32}O_3NCl$: Cl, 9.59. Found: 9.57.

EXAMPLE 3

*$\beta$-(2-methylpyrrolidyl)ether isoamylmandelate methobromide*

A benzene solution of 0.0185 mole of $\beta$-(2-methylpyrrolidyl)ethyl isoamylmandelate was prepared by shaking an aqueous solution of 6.8 grams of the hydrochloride with fifteen milliliters of a forty percent aqueous solution of sodium hydroxide and then extracting the whole with ether. The benzene layer was separated, washed thoroughly with water and then dried by vacuum distillation of a portion of the benzene. The dry benzene solution was filtered and then mixed in the cold with 45 grams (0.475 mole) of methyl bromide. The resulting solution was maintained in a tightly stoppered flask at room temperature for about four days. After the first few hours, crystals began to appear in the flask. The reuslting precipitate was filtered and dried to yield 5.5 grams, a yield of seventy percent of the theoretical, of $\beta$-(2-methylpyrrolidyl)ethyl isoamylmandelate methobromide melting at 148 to 151 degrees centigrade.

Calculated for $C_{21}H_{34}BrNO_3$: C, 58.87; H, 8.00; N, 3.27; Br, 18.65. Found: C, 58.77; H, 8.14; N, 3.14; Br, 18.35.

Similarly, other quaternary ammonium salts of $\beta$-2-methylpyrrolidyl)ethyl isoamylmandelate may be prepared by reaction of the latter compound with the selected alkyl halide, preferably lower-alkyl chloride, bromide, or iodide, e.g., ethyl bromide, ethyl chloride, methyl chloride, or methy iodide.

EXAMPLE 4

*$\beta$-(2,2-dimethylpyrrolidyl)ethyl isoamylmandelate hydrochloride*

Following the procedure described in Example 1, eight grams (0.03 mole) of isoamylmandelic acid, 7.2 grams (0.036 mole) of $\beta$-(2,2-dimethylpyrrolidyl)ethyl chloride hydrochloride and a large excess of potassium carbonate were reacted together in methyl-isobutylketone at 100 degrees centigrade for eight hours. There was thus obtained an 81.1 percent yield of $\beta$-(2,2-dimethylpyrrolidyl)ethyl isoamylmandelate hydrochloride. The hydrochloride, after conversion to the free base and then back to its hydrochloride and a recrystallization from a mixture of ethyl acetate and Skellysolve B (hexane hydrocarbons), melted at 113.5 to 116 degrees centigrade.

Calculated for $C_{21}H_{36}ClNO_3$: N, 3.69; Cl, 9.23. Found: N, 3.91; Cl, 9.39.

EXAMPLE 5

*$\beta$-(2,2-dimethylpyrrolidyl)ethyl cyclopentylmandelate hydrochloride*

Following the procedure described in Example 1, a mixture of 11.0 grams (0.05 mole) of cyclopentylmandelic acid [Biel, et al., J. Am. Chem. Soc., 74, 1485 (1952)], 10.0 grams (0.05 mole) of β-(2,2-dimethylpyrrolidyl)ethylchloride hydrochloride and 27.6 grams (0.2 mole) of potassium bicarbonate in acetone were reacted to produce β-(2,2-dimethylpyrrolidyl)ethyl cyclopentylmandelate hydrochloride in 61 percent yield. The crystalline hydrochloride, where crystallized from methylethylketone, melted at 162 to 163.5 degrees centigrade.

Calculated for $C_{21}H_{32}ClNO_3$: N, 3.67; Cl, 9.29. Found: N, 3.83; Cl, 9.17.

EXAMPLE 6

*β-(2,2-dimethylpyrrolidyl)ethyl cyclopentylmandelate methobromide*

β-(2,2-dimethylpyrrolidyl)ethyl cyclopentylmandelate methobromide was prepared in 64 percent yield by the reaction of an ether solution of β-(2,2-dimethylpyrrolidyl)ethyl cyclopentylmandelate (prepared in the manner described in Example 3) with a large molar equivalent excess of methyl bromide for 48 hours in a sealed glass tube. The pure product melts at 192 to 194 degrees centigrade.

Calculated for $C_{22}H_{33}BrNO_3$: Br, 18.13. Found: Br, 18.16.

Following the procedure described in Example 1, other acid addition salts of β-(2,2-dimethylpyrrolidyl)ethyl isoamylmandelate, β-(2-methylpyrrolidyl)ethyl isoamylmandelate, β-(2,2-dimethylpyrrolidyl)ethyl cyclopentylmandelate, β-(2-methylpyrrolidyl)ethyl cyclopentylmandelate, β-(2,2-dimethylpyrrolidyl)ethyl α-cyclopentyl-α-hydroxybutyrate, and other alkyl pyrrolidylalkyl esters of hydrocarbon substituted mandelic acids and other α-hydroxy acids may be prepared by reaction of the selected free base with a chemical or molar equivalent of the selected acid.

Following the procedure described in Example 3, the acid addition salts of the compounds described hereinbefore may be converted to quarternary ammonium salts, preferably lower-alkyl bromides, chlorides, or iodides, by reaction of the selected free base with the selected alkyl halide.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of (1) pyrrolidyl alkyl esters of the structural formula:

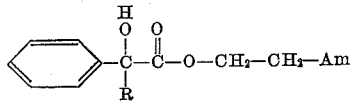

wherein R is a five carbon cyclic hydrocarbon group and Am is an N-pyrrolidyl radical selected from the group consisting of pyrrolidyl and methyl substituted pyrrolidyl; (2) acid addition salts thereof; and (3) quaternary ammonium salts thereof.

2. A compound according to claim 1 wherein R is cyclopentyl.

3. A compound according to claim 1 wherein Am is 2,2-dimethylpyrrolidyl.

4. A compound according to claim 2 wherein Am is 2,2-dimethylpyrrolidyl.

5. β - (2,2-dimethylpyrrolidyl)ethyl-α-hydroxy-α-cyclopentyl-α-phenylacetate hydrochloride.

6. β - (2,2-dimethylpyrrolidyl)ethyl-α-hydroxy-α-cyclopentyl-α-phenylacetate methobromide.

References Cited in the file of this patent

UNITED STATES PATENTS

| | | |
|---|---|---|
| 2,541,634 | Blicke | Feb. 13, 1951 |
| 2,648,666 | Robinson | Aug. 11, 1953 |
| 2,655,511 | Woodruff | Oct. 13, 1953 |
| 2,659,725 | Cusic et al. | Nov. 17, 1953 |
| 2,735,847 | Blicke | Feb. 21, 1956 |
| 2,752,385 | Cusic et al. | June 26, 1956 |

FOREIGN PATENTS

| | | |
|---|---|---|
| 291,676 | Switzerland | Oct. 1, 1953 |

OTHER REFERENCES

Jr. Am. Chem. Soc., vol. 64, pp. 428–433 (1942).
Helv. Chim. Acta., vol. 30, pp. 292–297 (1947).
Jr. Pharm. and Exp. Therap., vol. 108, 292–316 (1953).